(12) United States Patent
Grooms

(10) Patent No.: US 9,198,399 B1
(45) Date of Patent: Dec. 1, 2015

(54) PET TOY ASSEMBLY

(71) Applicant: Cinnamon L. Grooms, Fresno, CA (US)

(72) Inventor: Cinnamon L. Grooms, Fresno, CA (US)

( * ) Notice: Subject to any disclaimer, the term of this patent is extended or adjusted under 35 U.S.C. 154(b) by 0 days.

(21) Appl. No.: 14/285,312

(22) Filed: May 22, 2014

(51) Int. Cl.
*A01K 15/02* (2006.01)

(52) U.S. Cl.
CPC .................................. *A01K 15/025* (2013.01)

(58) Field of Classification Search
CPC ... A01K 15/025; A01K 15/026; A01K 15/02; A63F 9/0601; A63B 69/0079
USPC ................. 119/708, 702, 707, 709, 710, 711; 472/7; 473/430, 423, 422, 429
See application file for complete search history.

(56) References Cited

U.S. PATENT DOCUMENTS

| | | | | |
|---|---|---|---|---|
| 3,006,647 | A * | 10/1961 | Lee | 473/429 |
| 3,924,855 | A | 12/1975 | Pretorius | |
| 4,438,727 | A * | 3/1984 | Thompson | 119/708 |
| 4,576,379 | A * | 3/1986 | Juhasz | 473/430 |
| 4,674,744 | A * | 6/1987 | Walsh | 473/430 |
| 4,930,448 | A * | 6/1990 | Robinson | 119/708 |
| 5,103,770 | A * | 4/1992 | Berkovich | 119/708 |
| 5,119,001 | A * | 6/1992 | Moore et al. | 318/257 |
| 5,474,032 | A * | 12/1995 | Krietzman et al. | 119/708 |
| 5,657,721 | A * | 8/1997 | Mayfield et al. | 119/707 |
| 5,675,225 | A * | 10/1997 | Moore et al. | 318/257 |
| 5,778,825 | A * | 7/1998 | Krietzmen et al. | 119/708 |
| 5,875,737 | A * | 3/1999 | Boshears | 119/706 |
| 5,941,196 | A | 8/1999 | Domanski | |
| 6,058,887 | A * | 5/2000 | Silverman | 119/609 |
| 6,575,119 | B1 | 6/2003 | Lonsway | |
| 6,892,675 | B1 * | 5/2005 | Comerford | 119/708 |
| 2006/0266299 | A1 | 11/2006 | DiAntonio | |
| 2007/0283899 | A1 * | 12/2007 | Genitrini | 119/708 |
| 2007/0289550 | A1 * | 12/2007 | Huang | 119/707 |
| 2011/0277697 | A1 * | 11/2011 | Lipscomb et al. | 119/708 |
| 2012/0234258 | A1 | 9/2012 | Cook et al. | |

FOREIGN PATENT DOCUMENTS

| | | |
|---|---|---|
| CA | 1207148 A | 7/1986 |
| WO | WO9628965 | 9/1996 |

* cited by examiner

*Primary Examiner* — Trinh Nguyen

(57) ABSTRACT

A pet toy assembly provides entertainment and exercise for a pet. The assembly includes a frame having a middle section and a plurality of legs. Each of the legs is attached to and extends downwardly from the middle section to support the middle section above a ground surface. A tether is attached to and extends downwardly from the middle section. The tether is movable relative to the middle section. A target object is attached to a distal end of the tether with respect to the middle section.

9 Claims, 6 Drawing Sheets

PET TOY ASSEMBLY

BACKGROUND OF THE DISCLOSURE

Field of the Disclosure

The disclosure relates to toy devices and more particularly pertains to a new toy device for providing entertainment and exercise for a pet.

SUMMARY OF THE DISCLOSURE

An embodiment of the disclosure meets the needs presented above by generally comprising a frame having a middle section and a plurality of legs. Each of the legs is attached to and extends downwardly from the middle section to support the middle section above a ground surface. A tether is attached to and extends downwardly from the middle section. The tether is movable relative to the middle section. A target object is attached to a distal end of the tether with respect to the middle section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
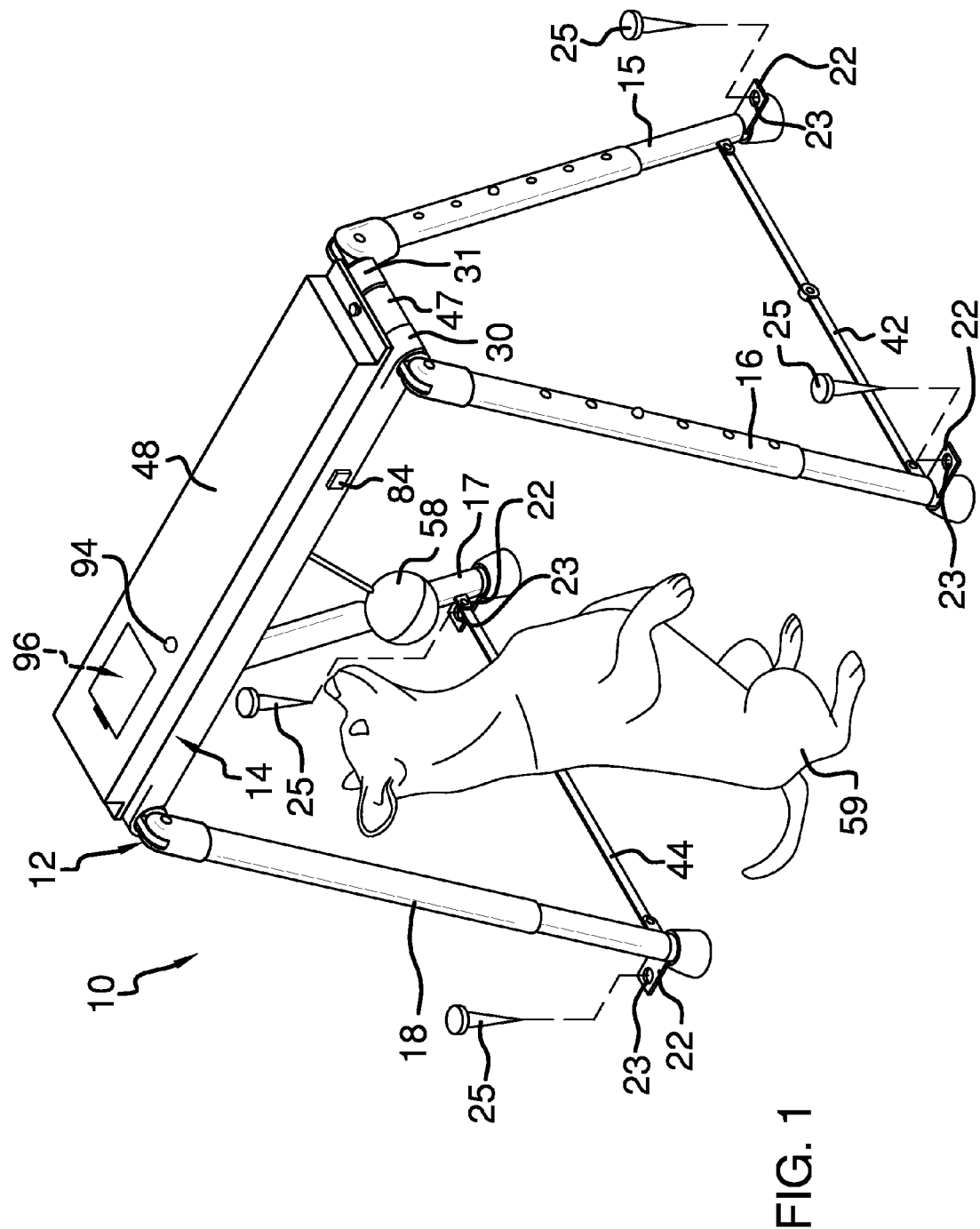
FIG. 1 is a top front side perspective view of a pet toy assembly according to an embodiment of the disclosure in use.
Figure 2:
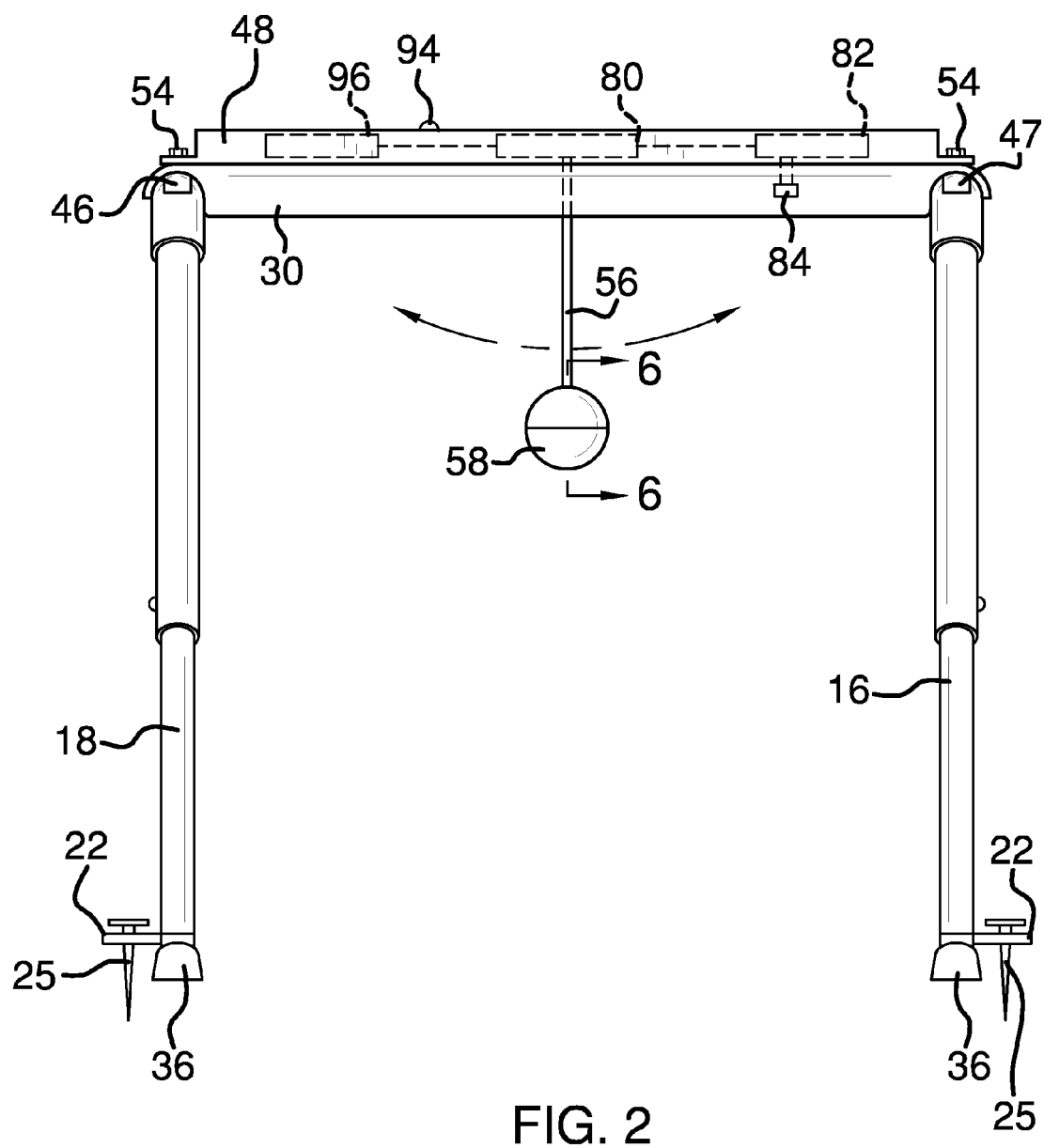
FIG. 2 is a front view of an embodiment of the disclosure.
Figure 3:
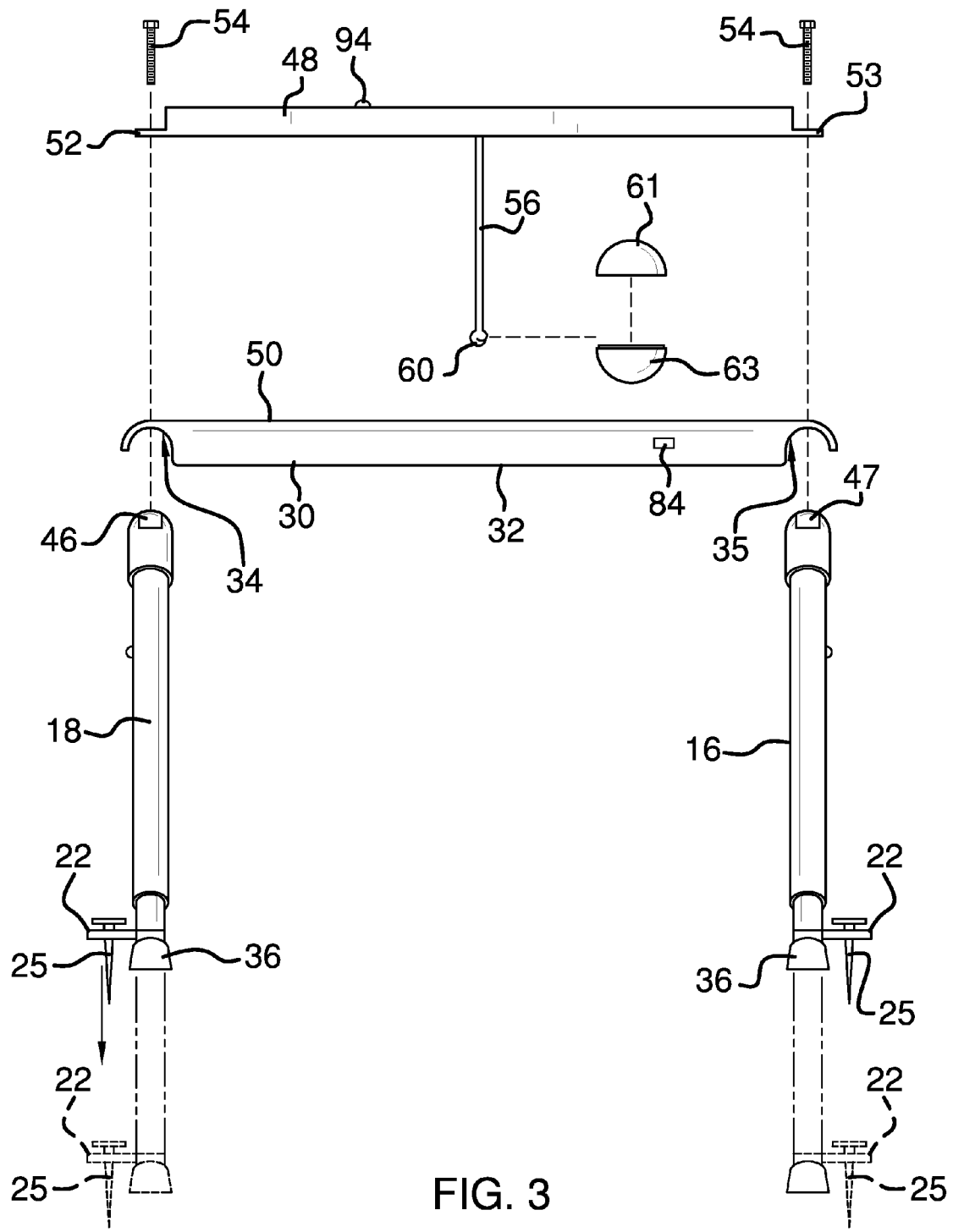
FIG. 3 is a partially-exploded front view of an embodiment of the disclosure.
Figure 4:
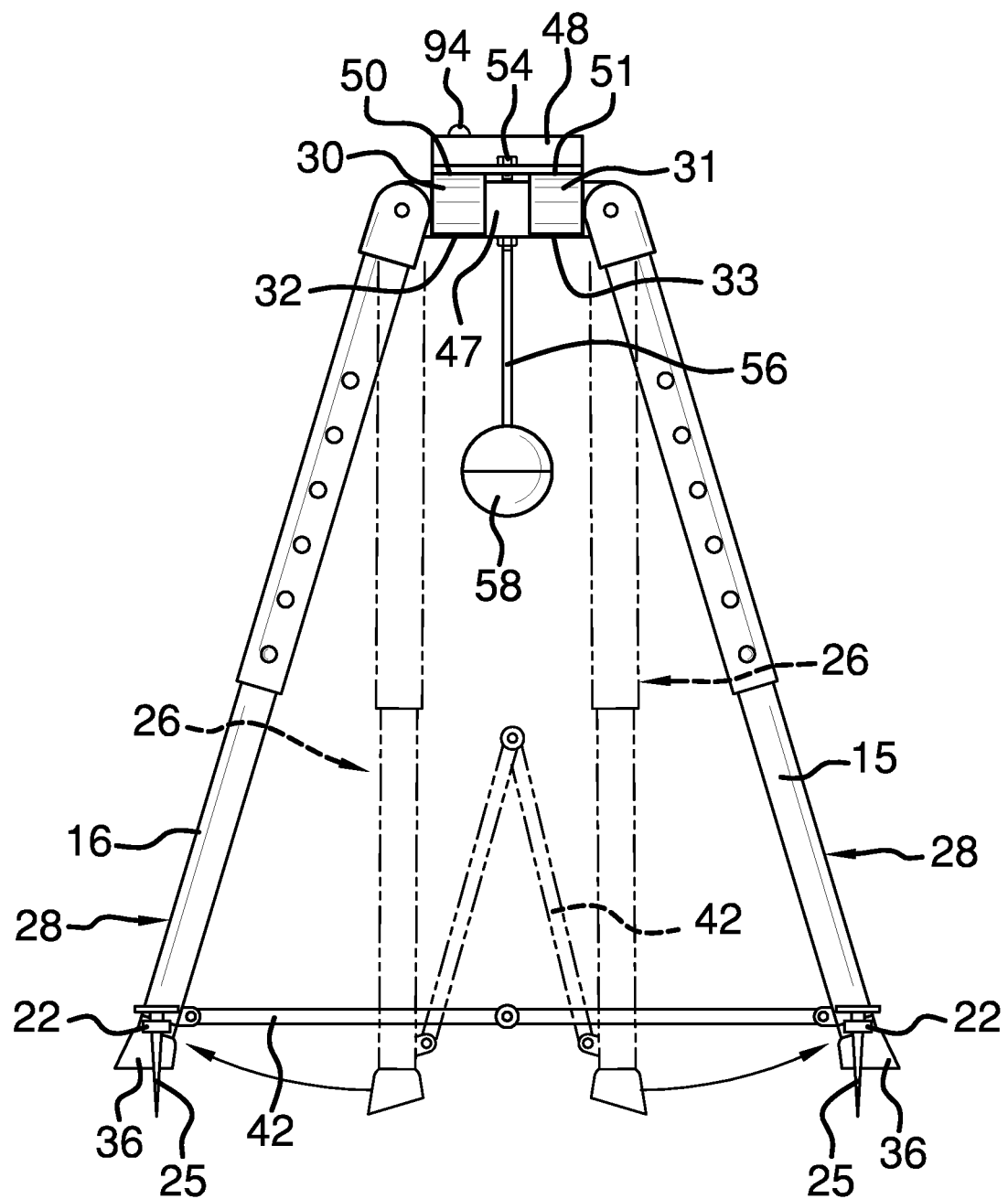
FIG. 4 is a side view of an embodiment of the disclosure.
Figure 5:
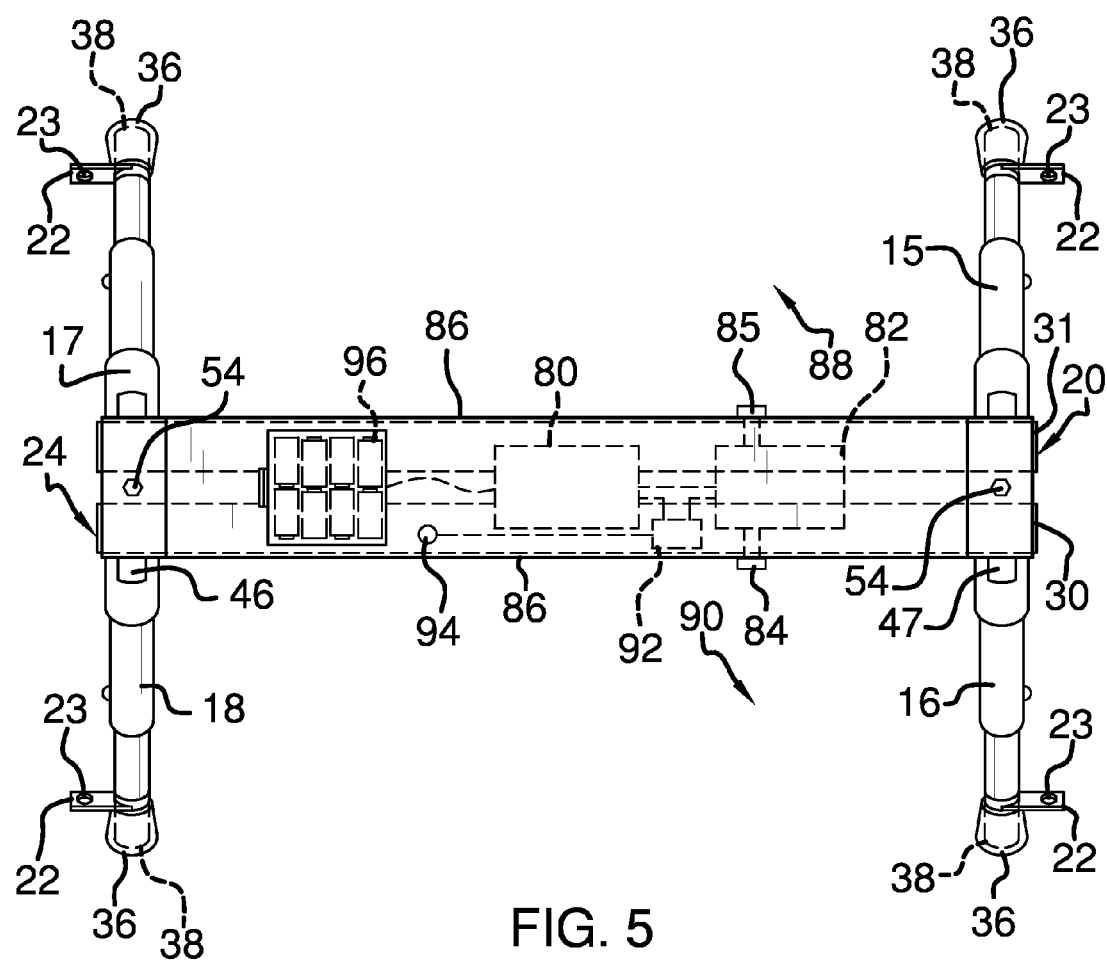
FIG. 5 is a top view of an embodiment of the disclosure.
Figure 6:
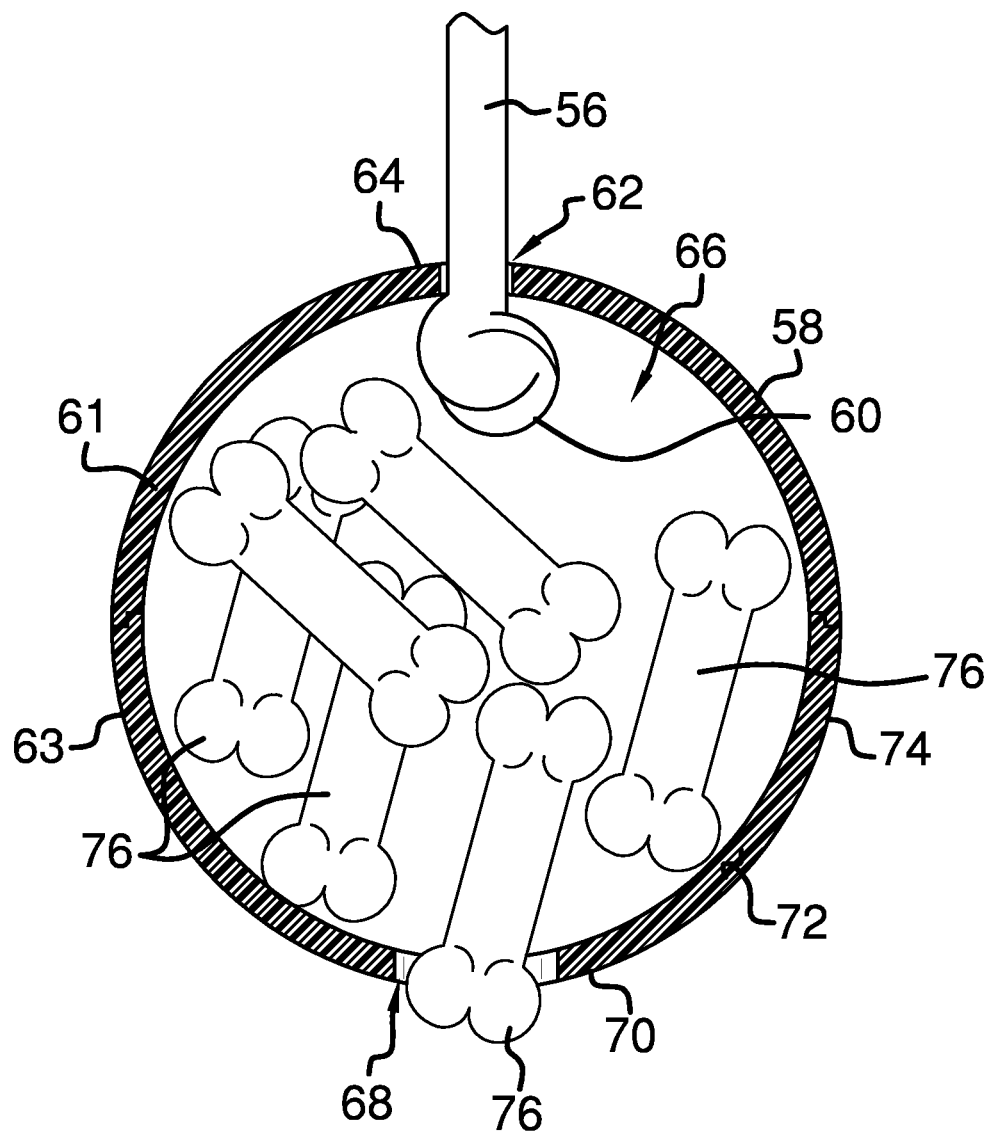
FIG. 6 is a cross-sectional view of an embodiment of the disclosure taken along line 6-6 of FIG. 2.

With reference now to the drawings, and in particular to FIGS. 1 through 6 thereof, a new toy device embodying the principles and concepts of an embodiment of the disclosure and generally designated by the reference numeral 10 will be described.

As best illustrated in FIGS. 1 through 6, the pet toy assembly 10 generally comprises a frame 12 having a middle section 14 and a plurality of legs 15, 16, 17, 18. Each of the legs 15, 16, 17, 18 is attached to and extends downwardly from the middle section 14 to support the middle section 14 above a ground surface. The plurality of legs 15, 16, 17, 18 includes a first pair of legs 15, 16 coupled adjacent to a first end 20 of the middle section 14 and a second pair of legs 17, 18 coupled adjacent to a second end 24 of the middle section 14. Each of the legs 15, 16, 17, 18 may be telescopically adjustable in a conventional manner to adjust a height of the middle section 14 relative to the ground surface. A plurality of feet 36 may be provided wherein each of the feet 36 is coupled to a bottom end 38 of an associated one of the legs 15, 16, 17, 18. Each of the feet 36 is comprised of a non-slip material, such as an elastomer or the like. Each of the legs 15, 16, 17, 18 may have a respective bracket 22 attached adjacent to the bottom end 38 of the associated leg 15, 16, 17, 18. Each bracket 22 has a respective aperture 23 extending therethrough wherein each aperture 23 is configured to receive a stake 25 to retain the assembly 10 where positioned.

Each of the legs 15, 16, 17, 18 may be pivotally coupled to the middle section 14 for pivoting each of the legs 15, 16, 17, 18 between a stored position 26 and a deployed position 28. A pair of braces 42, 44 is provided and each is hingedly coupled to the frame 12. A first one 42 of the braces is coupled to and extends between the first pair of legs 15, 16. A second one 44 of the braces is coupled to and extends between the second pair of legs 17, 18. A width of the frame 12 may have a distance between approximately 75.0 cm and 120.0 cm as measured between the feet 36 on the first pair of legs 15, 16 and the feet 36 on the second pair of legs 17, 18. The frame 12 may have a height between approximately 90.0 cm and 185.0 cm as measured from the middle section 14 to the ground surface. The frame 12 may be constructed from a rigid material, such as metal, plastic or the like.

The middle section 14 includes a pair of support members 30, 31. Each of the support members 30, 31 is positioned in spaced parallel relationship relative to each other and is horizontally orientated relative to the ground surface. Each of the support members 30, 31 has a respective bottom surface 32, 33. Each bottom surface 32, 33 of the support members 30, 31 has a pair of slots 34, 35 extending upwardly therein. A pair of plates 46, 47 is provided. Each of the plates 46, 47 is insertable into an associated pair of the slots 34, 35. Each of the plates 46, 47 has an associated one of the first pair of legs 15, 16 and second pair of legs 17, 18 pivotally attached thereto. A housing 48 is coupled to and extends across a top surface 50, 51 of each of the support members 30, 31. The housing 48 includes a pair of outwardly extending flanges 52, 53. Each of the flanges 52, 53 is positioned above an associated one of the plates 46, 47. A pair of fasteners 54 is provided. Each of the fasteners 54 extends through and engages an associated one of the flanges 52, 53 and an associated one the plates 46, 47 for releasably coupling the housing 48 to the plates 46, 47.

A tether 56 is attached to and extends downwardly from the middle section 14. The tether 56 may be either flexible or rigid but is preferably constructed from a material durable enough to withstand being chewed upon by a pet 59 without fraying or otherwise breaking. A target object 58 is attached to a distal end 60 of the tether 56 with respect to the middle section 14. The target object 58 has a top opening 62 positioned in a top side 64 of the target object 58. The distal end 60 of the tether 56 is positionable to define a knot having a greater diameter than an inner diameter of the top opening 62 such that the distal end 60 of the tether 56 is retained within an interior space 66 of the target object 58 to suspend the target object 58 from the tether 56. The target object 58 has a bottom opening 68 positioned in a bottom side 70 of the target object 58. The target object 58 is comprised of a resiliently flexible material 72, such as rubber or the like. However, it is preferred that the target object 58 be durable enough to withstand being chewed upon by the pet 59. An outer edge 74 of the target object 58 may be annular such that the target object 58 defines a ball. Pet treats 76 are positionble within the interior space 66 of the target object 58 and are accessible to the pet 59 through the bottom opening 68. The target object 58 is separable into a first section 61 and a second section 63 to permit access into the interior space 66 of the target object 58 to re-fill the pet treats 76 as needed.

A motor 80 is coupled to the frame 12 and is positioned within an interior of the housing 48. The motor 80 is operationally coupled to the tether 56 wherein actuation of the motor 80 causes movement of the tether 56 relative to the middle section 14. A motion sensor 82 is coupled to the frame 12. The motion sensor 82 is operationally coupled to the motor 80 for activating the motor 80 upon detection of motion in areas 88, 90 adjacent to the motion sensor 82. The motion sensor 82 includes a pair of motion detectors 84, 85. Each of the motion detectors 84, 85 is attached to opposing longitudinal sides 86 of the middle section 14. Alternatively, the motor 80 may also be controlled by a remote control using a conventional transmitter and receiver.

A processor 92 is coupled to the frame 12 and operationally coupled to the motor 80 and the motion sensor 82. The processor 92 receives input from the motion sensor 82 and activates the motor 80 upon receiving input of motion detected in areas 88, 90 adjacent to the motion sensor 82. An actuator 94 is coupled to the frame 12 and is operationally coupled to the processor 92 wherein mainpulation of the actuator 94 selectively actuates the motor 80. A power source 96 is coupled to the frame 12 and is electrically coupled to the motor 80, the processor 92 and the motion sensor 82. The power source 96 may comprise at least one rechargeable battery.

In use, as stated above and shown in the Figures, the actuator 94 is manipulated and the motion sensor 82 is used to detect motion within the areas 88, 90 adjacent to the motion sensor 82. Whenever motion is detected by the motion sensor 82, the motor 80 will move the tether 56 relative to the middle section 14, causing the target object 58 to move as well. A pet 59 may try to catch the target object 58 as it moves and may manipulate the target object 58 in order to obtain access to the pet treats 76 stored within the target object 58. In this manner, the assembly 10 provides both entertainment and exercise for the pet 59.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet toy assembly comprising:
    a frame having a middle section and a plurality of legs, each of said legs being attached to and extending downwardly from said middle section to support said middle section above a ground surface, each of said legs having an associated bottom end, each of said legs having a respective bracket attached adjacent to said bottom end of said associated leg, each said bracket having a respective aperture extending therethrough wherein each said aperture is configured to receive a stake;
    a tether attached to and extending downwardly from said middle section, said tether being movable relative to said middle section;
    a target object attached to a distal end of said tether with respect to said middle section, said target object having a top opening positioned in a top side of said target object, said distal end of said tether being positionable to define a knot having a greater diameter than an inner diameter of said top opening such that said distal end of said tether is retained within an interior space of said target object to suspend said target object from said tether;
    a plurality of feet, each of said feet being coupled to a bottom end of an associated one of said legs, each of said feet being comprised of a non-slip material;
    a motor coupled to said middle section, said motor being operationally coupled to said tether wherein actuation of said motor causes movement of said tether relative to said middle section; and
    a motion sensor coupled to said frame, said motion sensor being operationally coupled to said motor for activating said motor upon detection of motion in areas adjacent to said motion sensor.

2. The assembly of claim 1, further comprising each of said legs being telescopically adjustable.

3. The assembly of claim 1, further comprising each of said legs being pivotally coupled to said middle section for pivoting each of said legs between a stored position and a deployed position.

4. The assembly of claim 3, further comprising:
    said plurality of legs including a first pair of legs coupled adjacent to a first end of said middle section and a second pair of legs coupled adjacent to a second end of said middle section; and
    a pair of braces each hingedly coupled to said frame, a first one of said braces being coupled to and extending between said first pair of legs, a second one of said braces being coupled to and extending between said second pair of legs.

5. The assembly of claim 1, further comprising said target object being comprised of a resiliently flexible material.

6. The assembly of claim 5, further comprising said target object having a bottom opening positioned in a bottom side of said target object wherein said target object is configured to receive pet treats therein through said bottom opening.

7. The assembly of claim 1, further comprising wherein said motion sensor includes a pair of motion detectors, each of said motion detectors being attached to opposing longitudinal sides of said middle section.

8. The assembly of claim 1, further comprising said target object being separable into a pair of sections to provide access into an interior space of said target object.

9. A pet toy assembly comprising:
    a frame having a middle section and a plurality of legs, each of said legs being attached to and extending downwardly from said middle section to support said middle section above a ground surface, said plurality of legs including a first pair of legs coupled adjacent to a first end of said middle section and a second pair of legs coupled adjacent to a second end of said middle section, each of said legs being telescopically adjustable, each of said legs being pivotally coupled to said middle section for pivoting each of said legs between a stored position and a deployed position, each of said legs having an associated bottom end, each of said legs having a respective bracket attached adjacent to said bottom end of said associated leg, each said bracket having an aperture extending therethrough wherein each said aperture is configured to receive a stake;

a plurality of feet, each of said feet being coupled to said bottom end of said associated leg, each of said feet being comprised of a non-slip material;

a pair of braces each hingedly coupled to said frame, a first one of said braces being coupled to and extending between said first pair of legs, a second one of said braces being coupled to and extending between said second pair of legs;

a tether attached to and extending downwardly from said middle section, said tether being movable relative to said middle section;

a target object attached to a distal end of said tether with respect to said middle section, said target object having a top opening positioned in a top side of said target object, said distal end of said tether being positionable to define a knot having a greater diameter than an inner diameter of said top opening such that said distal end of said tether is retained within an interior space of said target object to suspend said target object from said tether, said target object having a bottom opening positioned in a bottom side of said target object wherein said target object is configured to receive pet treats therein through said bottom opening, said target object being comprised of a resiliently flexible material, said target object being separable into a pair of sections to provide access into said interior space of said target object;

a motor coupled to said middle section, said motor being operationally coupled to said tether wherein actuation of said motor causes movement of said tether relative to said middle section; and a motion sensor coupled to said frame, said motion sensor being operationally coupled to said motor for activating said motor upon detection of motion in areas adjacent to said motion sensor, said motion sensor including a pair of motion detectors, each of said motion detectors being attached to opposing longitudinal sides of said middle section.

* * * * *